Oct. 11, 1960     C. OICKLE, JR     2,955,799
BLADE DAMPING MEANS
Filed Feb. 11, 1957
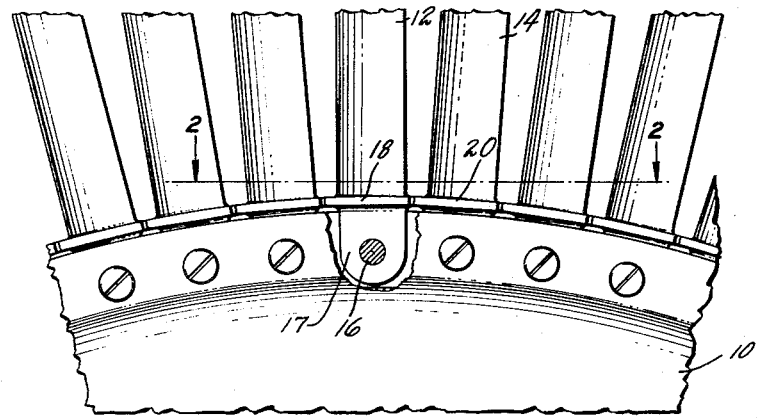
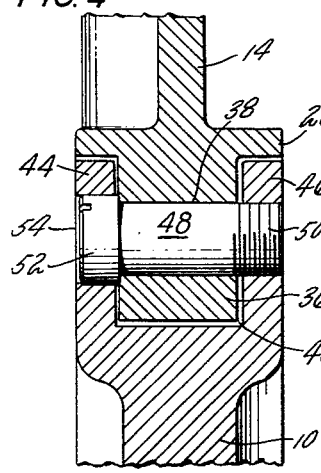
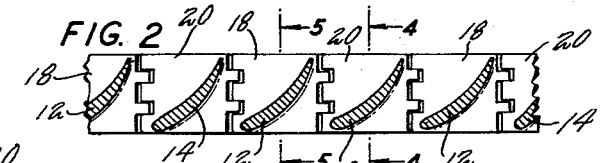
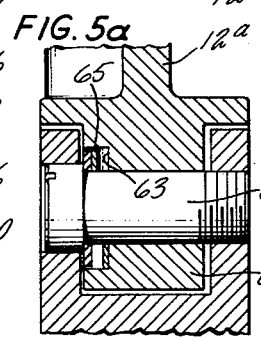
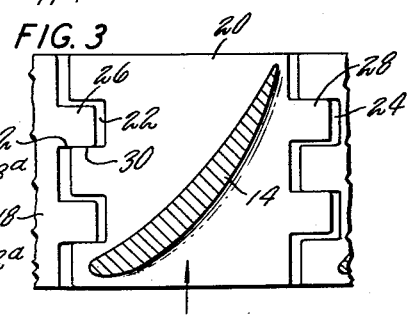
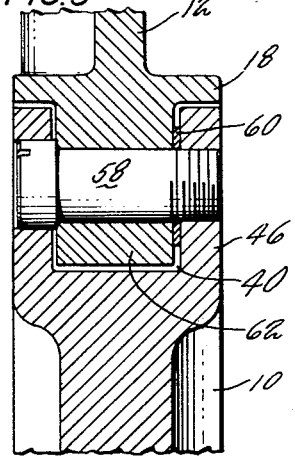
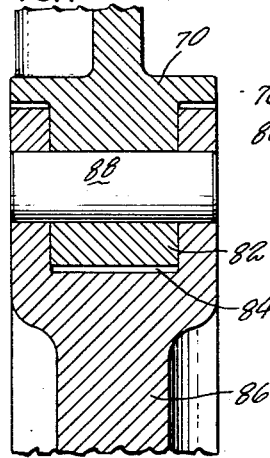
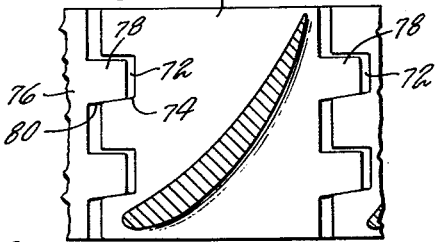
INVENTOR
CHARLES OICKLE JR.
BY
ATTORNEY

United States Patent Office 2,955,799
Patented Oct. 11, 1960

2,955,799

BLADE DAMPING MEANS

Charles Oickle, Jr., New Britain, Conn., assignor to United Aircraft Corporation, East Hartford, Conn., a corporation of Delaware Filed Feb. 11, 1957, Ser. No. 639,293

8 Claims. (Cl. 253—77)

This invention relates to turbomachinery and more particularly to frictional means for damping blade flutter, vibration, or other undesirable motion.

It is an object of this invention to provide frictional damping means for pin mounted compressor or turbine blades to reduce vibrational or flutter motion about the pin mounting.

It is a further object of this invention to provide the turbomachine blades with root platforms having recesses and projections, thereby forming cooperating surfaces which can be suitably loaded to provide the necessary friction for damping blade motion about its pin mounting.

These and other objects of this invention will become readily apparent from the following detailed description of the drawing in which:

Fig. 1 is a partial illustration of a turbomachine including its blading;

Fig. 2 is a cross-sectional view taken along the line 2—2 of Fig. 1;

Fig. 3 is an enlarged cross section showing one full blade of Fig. 2;

Fig. 4 is a cross-sectional enlarged detail taken along the line 4—4 of Fig. 2;

Fig. 5 is an enlarged cross-sectional detail taken along the line 5—5 of Fig. 2;

Fig. 5a is a modification of the Fig. 5 showing;

Fig. 6 is a modification of the Fig. 3 configuration; and

Fig. 7 is an enlarged detailed cross section illustrating a typical mounting for a blade of the type shown in Fig. 6.

Referring to Fig. 1, a portion of a turbomachine such as a compressor or turbine is illustrated. The turbomachine may comprise a hub or rotor 10 having a plurality of blades such as 12 and 14 mounted in or to the hub by means of a suitable pin 16. The blades 12 and 14 each have a root 17 which includes an integral platform 18 or 20, and, as seen in Figs. 4 and 5, extensions 62 or 36, respectively.

As seen in Figs. 2 and 3, each of the platforms 18 and 20 include a plurality of recesses 22 and 24 and a plurality of cooperating projections 26 and 28.

Taking for example the recess 22 and the projection 26, each of these members includes engageable surfaces 30 and 32, respectively. Thus, for easy installation, the recess 22 may be slightly larger than the projection 26.

As best seen in Fig. 4, the blade 14, for example, has depending from its platform 20 a root 36 having a drilled passage 38 therethrough. The root extension 36 is connected to the airfoil portion 14 of the blade by means of the platform 20. The root 36 fits into the groove 40 formed in the outer periphery of the hub 10 by a bifurcation comprising the tine-like elements 44 and 46. Actually the elements 44 and 46 are the side walls of the groove 40. A threaded bolt-like element 48 fits loosely in the passage 38 of the depending root element 36 so that the blade 14 can have some pivotal movement about the axis of the bolt or pin 48. The threads 50 cooperate with corresponding internal threads in the member 46, while the head 52 of the bolt 48 can pass through the opening 54 in the tine-like element 44. It will thus be seen that as the bolt 48 is tightened, the enlarged head 52 will engage the depending root element or extension 36 of the blade 14 urging it toward the right in the opening or groove 40 formed in the periphery of the hub 10.

As seen in Fig. 5, the next adjacent blade 12 has a bolt 58 similar to the bolt 48 which mounts the blade 14 but a washer 60 is provided between the depending member 62 of the blade 12 and the right-hand portion 46 of the channel 40 at the outer periphery of the hub 10. The washer 60 thus fixes the position of the blade 12 as well as its platform 18 along the axis of the pin or bolt 58. Thus, supposing that in Fig. 5 the platform 18 of the blade 12 is fixed, it will be apparent that the blade 14 as well as its platform 20 is axially adjustably positioned in the direction of the arrow as seen in Fig. 3. This causes engagement of the surfaces 30 and 32 whereby the pressure bearing on the surfaces is adjusted. This adjustment is made by tightening the bolt 48 illustrated in Fig. 4. It is thus seen that with the proper adjustment of the bolt 48, a predetermined amount of friction can be imposed to dampen pivotal motion of the blades about their respective pin or bolt mountings.

As seen in Fig. 5a the depending portion or extension 62a of the blade 12a includes a notch 63. A wave washer or spring 65 is inserted in the notch 63. The head of the bolt or pin 58a then engages washer or spring 65 so that a resilient pressure or load is applied to the blade root in a direction along the axis of pin 58a. Thus alternate blades may be spring biased to take up any motion due to wear.

Where it is not desired to preload alternate blades in a direction along the axis of the pin mounting, it may be desirable to provide a platform configuration 70 such as that shown in Fig. 6. In this case the platform 70 includes a recess 72 having a tapered surface 74. The next adjacent platform 76 includes a projection 78 having a tapered surface 80 engageable with the surface 74. Of course it is apparent that the tapers of the surfaces 74 and 80 should be slightly different or, in fact, one of the surfaces may be straight so that if there is relative motion between the platform 70 and the platform 76 about their respective pin mountings, the friction between surfaces 74 and 80 will vary.

As seen in Fig. 7, in this modification the platform 70 has a depending root element 82 which fits snugly within the groove 84 formed in the outer periphery of the hub or rotor 86. This snug fit prevents movement of the depending element 82 and the platform 70 along the axis of the pin mounting 88.

It is thus apparent that as a result of this invention a highly effective frictional damping means has been provided for reducing vibratory stresses in turbomachine blading. Furthermore, efficient damping is provided by a means readily adaptable to present day mounting mechanisms, as well as root platforms of the blading.

Although several embodiments of this invention have been illustrated and described herein, it will become readily apparent that various changes and modifications may be made in the construction and arrangement of the various parts without departing from the scope of this novel concept.

What it is desired by Letters Patent is:

1. In a turbomachine, a rotor including a hub, a plurality of blades circumferentially spaced about said hub, said blades having roots, interengaging means mounting said blades in said hub with axial play therebetween, said interengaging means including a single pin support connecting the root of each of said blades to the rotor thereby permitting limited pivotal movement about the pin and limited play along the pin axis, each of said pins having an axis substantially parallel with the axis of rotation of said rotor, each of said blades including at least one projection, at least one recess in the next adjacent blade receiving and engaging said projection, said recess and said projection having cooperating engaging surfaces which lie in planes substantially transverse to the rotor axis, and means operatively connected to said blade roots and said hub for urging the said cooperating surface of one blade against the cooperating engaging surface of the next adjacent blade whereby the pressure between said engaging surfaces provides a frictional damping against movement of said blades about each of said pin supports.

2. In a turbomachine, a rotor including a hub, a plurality of blades circumferentially spaced about said hub, said blades having roots, interengaging means mounting said blades in said hub with axial play therebetween, said interengaging means including a single pin connecting the root of each of said blades to the rotor thereby permitting limited pivotal movement about the pin and limited play along the pin axis, each of said pins having an axis substantially parallel with the axis of rotation of said rotor, means engaged with said blades for adjustably positioning at least one of said pins in said hub to position the blade along said axis, each of said blade roots including a plurality of projections, a plurality of recesses in the next adjacent blade root cooperating with and engaging said projections, and means for urging one of said blades in a direction along the axis of its connecting pin to provide damping of movement about said pins resulting from the engagement between said projections and recesses.

3. In a turbomachine, a rotor including a hub, a plurality of blades circumferentially spaced about said hub, said blades having roots, interengaging means for mounting said blades in said hub with axial play therebetween, said interengaging means including a single pin connecting the root of each of said blades to the rotor thereby permitting limited pivotal movement about the pin and limited play along the pin axis, each of said pins having an axis substantially parallel with the axis of rotation of said rotor, each of said blade roots including a plurality of projections, a plurality of recesses in the next adjacent blade root receiving said projections, said recesses and said projections being of different dimensions along said axis and having cooperating surfaces adapted to engage each other and spring biased means engageable with said blade roots and hub and urging the surface of one blade against the cooperating engaging surface of the next adjacent blade whereby the pressure between said engaging surfaces provides a frictional damping against movement of said blades about each of said pin supports.

4. In a turbomachine, a rotor including a hub, a plurality of blades circumferentially spaced about said hub, said blades having roots, interengaging means mounting said roots in said hub with axial play therebetween, said interengaging means including a single pin connecting the root of each of said blades to the rotor thereby permitting limited pivotal movement about the pin and limited play along the pin axis, each of said blade roots including a projection, a recess in the next adjacent blade root receiving said projection, said projection and recess having cooperating engageable surfaces, and spring means engaged by said pins for adjustable positioning said roots along the axis of said pins thereby urging said engageable surfaces together to provide frictional damping for said blades.

5. In a turbomachine, a rotor including a hub, a plurality of blades circumferentially spaced about said hub, said blades having roots, interengaging means mounting said roots in said hub with axial play therebetween, said interengaging means including a single pin connecting the root of each of said blades to said rotor thereby permitting limited pivotal movement about the pin, and limited play along the pin axis, each of said blade roots including a projection, a recess in the next adjacent blade root cooperating with said projection, and being somewhat larger in axial width than said projection, said projection and recess having cooperating engageable surfaces, and means carried by alternate pins and engaging said roots for adjustably positioning the roots of alternate blades along the axis of said pins thereby urging said engageable surfaces together to provide frictional damping for said blades.

6. In a turbomachine, a rotor including a hub having an axis of rotation, a plurality of blades circumferentially spaced about said hub, said blades having roots, interengaging means mounting said roots in said hub with axial play therebetween, said interengaging means including a single pin connecting the root of each of said blades to said rotor thereby permitting limited pivotal movement about the pin and limited play along the pin axis, each of said pins having an axis substantially parallel with the axis of rotation of said rotor, each of said blade roots including a plurality of projections, and a plurality of recesses in the next adjacent blade root cooperating with said projections, said recesses and said projections of adjacent blades having cooperating tapered engaging surfaces, said surfaces lying in planes extending substantially transversely of the axis of said pins, whereby the pressure between said engaging surfaces varies with the amount of movement of said adjacent blades about each of said pins.

7. In a turbomachine, a rotor including a hub having an axis of rotation, a plurality of radially extending blades circumferentially spaced about said hub, said blades having roots, interengaging means mounting said roots in said hub with axial play therebetween, said interengaging means including a single pin support connecting the root of each of said blades to the rotor thereby permitting limited pivotal movement about the pin and limited play along the pin axis, each of said pins having an axis substantially parallel with the axis of rotation of said rotor, each of said blade roots including a plurality of projections having friction surfaces, a plurality of recesses in the next adjacent blade root having surfaces cooperating with and engaging the friction surfaces on said projections to provide frictional damping of movement about said pins, and means carried by said pins and cooperating with said roots and rotor and including adjustable mechanism urging one of said blades along the axis of its pin for urging the friction surfaces of said projections against the cooperating surfaces of said recesses.

8. In a turbomachine, a rotor including a hub, a plurality of blades circumferentially spaced about said hub, said blades having roots, interengaging means mounting said roots in said hub with axial play therebetween, said interengaging means including a single pin connecting the root of each of said blades to the hub thereby permitting limited pivotal movement about the pin and limited play along the pin axis, each of said blade roots including a projection, a recess in the next adjacent blade root cooperating with said projection, said projection and recess having engaging surfaces which lie in planes substantially transversely of the rotor axis, means carried by said pins and engaging said roots, means cooperating with said pins and roots and adjustably urging said roots relative to said pins along the axis of said pins thereby loading said engaging surfaces to provide frictional damping for said blades.

References Cited in the file of this patent

UNITED STATES PATENTS

| 2,398,140 | Heppner | Apr. 9, 1946 |

FOREIGN PATENTS

| 497,939 | Canada | Nov. 24, 1953 |
| 662,357 | Great Britain | Dec. 5, 1951 |
| 750,397 | Great Britain | June 13, 1956 |